June 30, 1964   A. H. JACOBSON ETAL   3,139,570
POSITIONAL SERVO SYSTEM
Filed April 17, 1961   8 Sheets-Sheet 1
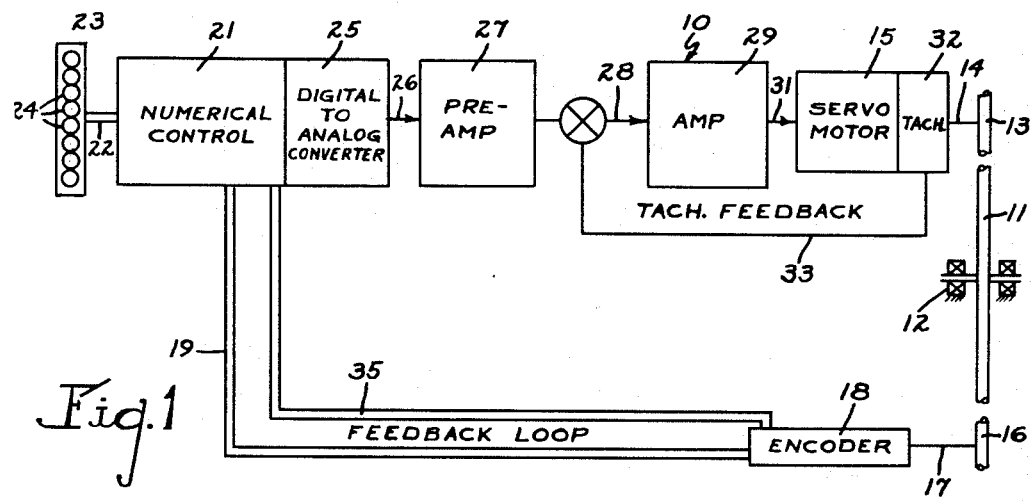
Fig.1
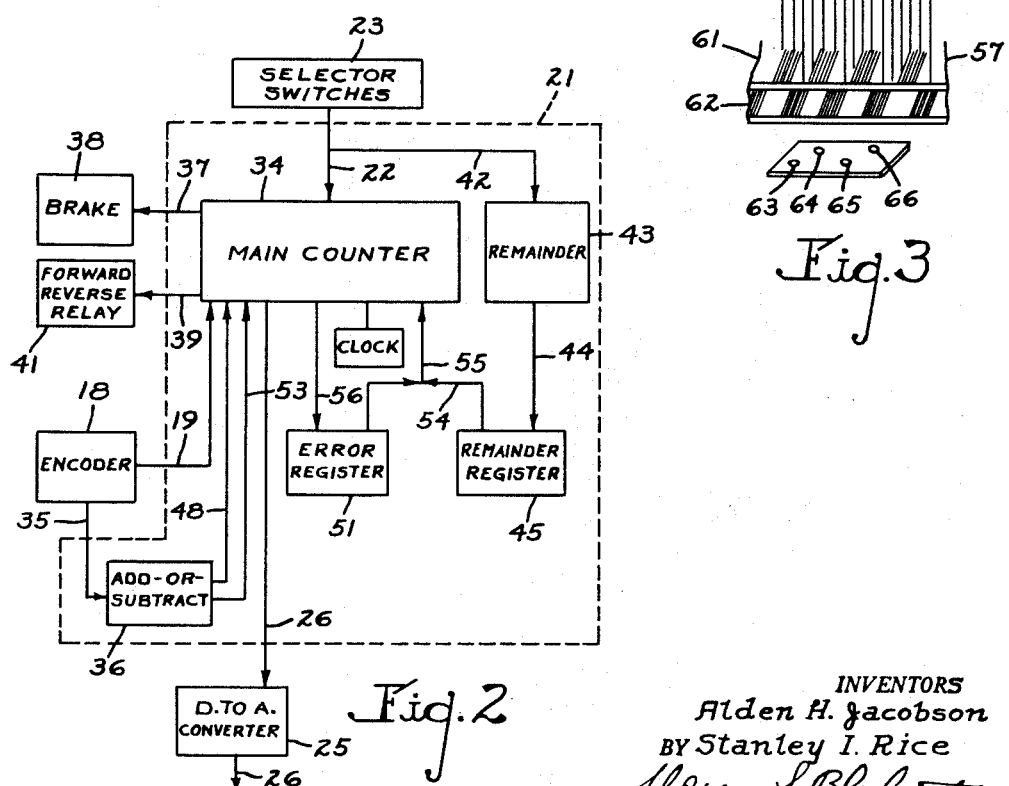
Fig.2
Fig.3
INVENTORS
Alden H. Jacobson
BY Stanley I. Rice
Norman S. Blodgett
Attorney

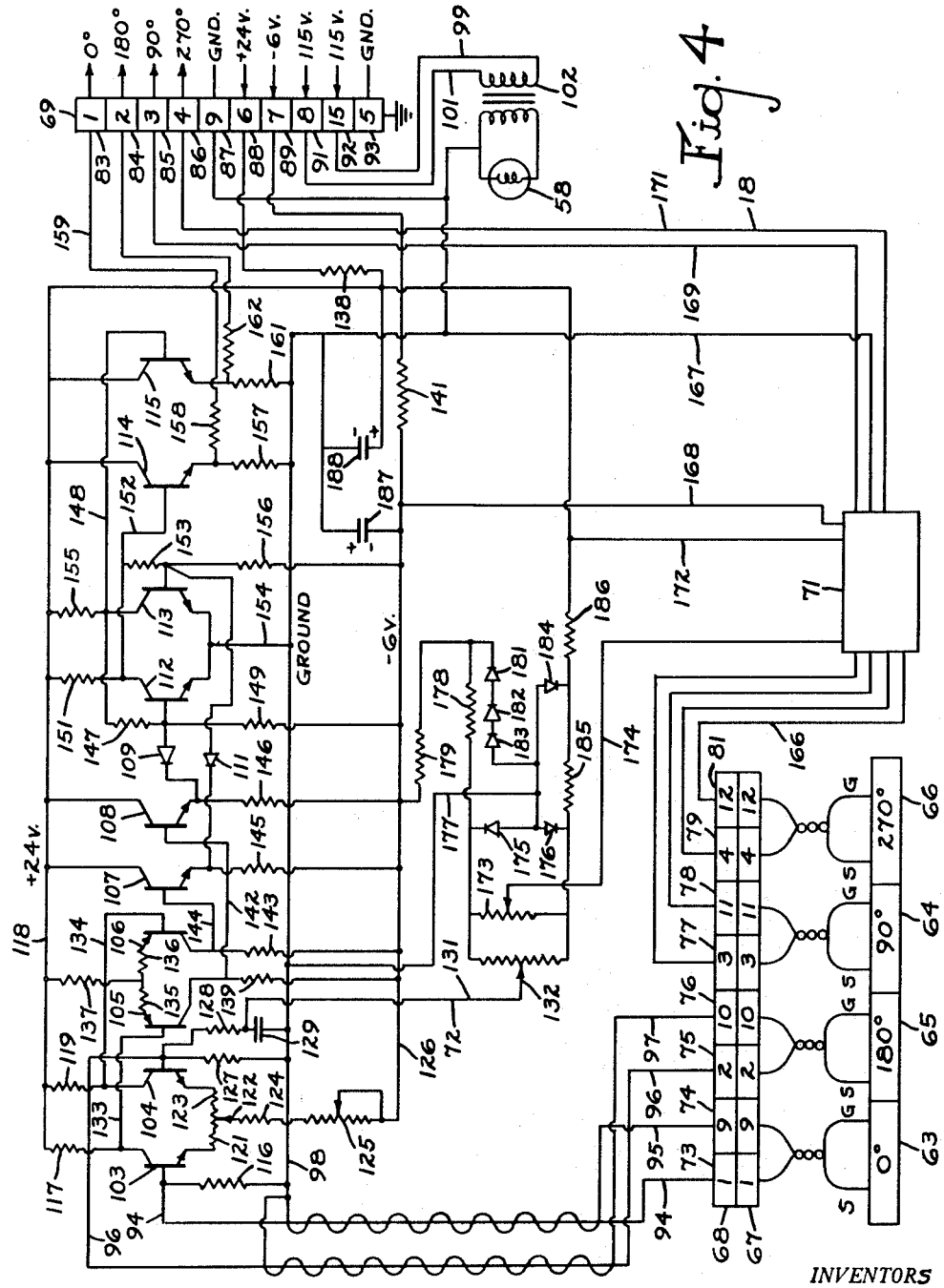

June 30, 1964
A. H. JACOBSON ETAL
3,139,570
POSITIONAL SERVO SYSTEM
Filed April 17, 1961
8 Sheets-Sheet 3
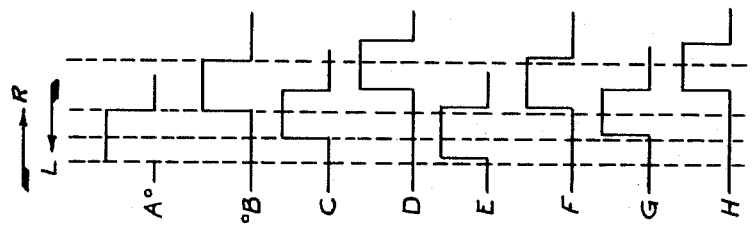
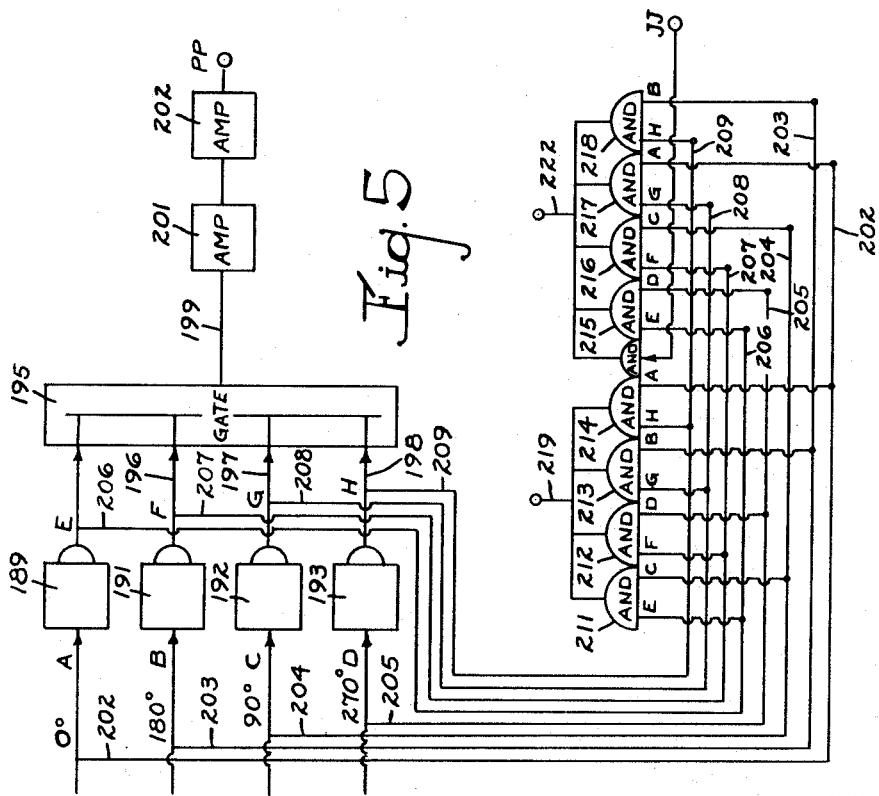
INVENTORS
Alden H. Jacobson
Stanley I. Rice
BY
Norman L. Blodgett
Attorney INVENTORS
Alden H. Jacobson
BY Stanley I. Rice
Norman S. Blodgett
Attorney INVENTORS
Alden H. Jacobson
BY Stanley I. Rice
Attorney United States Patent Office 3,139,570
Patented June 30, 1964

3,139,570
POSITIONAL SERVO SYSTEM
Alden H. Jacobson, Paxton, and Stanley I. Rice, Worcester, Mass., assignors to The Heald Machine Company, Worcester, Mass., a corporation of Delaware
Filed Apr. 17, 1961, Ser. No. 103,536
5 Claims. (Cl. 318—28)

This invention relates to an index head and more particularly to apparatus arranged to locate accurately a workpiece relative to a machine tool for performing a machining operation.

In the machine tool industry, one of the greatest problems is the location of a workpiece relative to the machine tool. As machining operations become more and more automated, it becomes important that the operation of locating the workpiece take place automatically and without assistance from the operator. One of the problems encountered in the construction of such devices is that any mechanical device when moved does not stop instantly but comes to rest in a final position, which is the result of a certain degree of "hunting" about an imaginary zero point. Computer-controlled index heads of the past have suffered from this disability and, furthermore, have not be capable of locating workpieces to a high degree of accuracy. These and other difficulties experienced with the prior art devices have been obviated in a novel manner by the present invention.

It is, therefore, an outstanding object of the invention to provide an index head having a regulating apparatus which takes into consideration the hunting action of the movable element in coming to a complete stop.

Another object of this invention is the provision of an indexing head making use of computing equipment in which the control increment is very small.

A further object of the present invention is the provision of an index head driven by a motor from an initial position to a final position in which the energization of the motor is proportional to the distance from the final position.

It is another object of the instant invention to provide an index head in which the error in the final position of the movable member is taken into consideration before the movable member moves to another position.

It is a further object of the invention to provide an index head capable of moving a workpiece to a number of sequential positions, accumulated errors being removed from time to time.

A still further object of this invention is the provision of an index head in which a main numerical control is informed at all times not only of the direction of movement of the movable element about a final predetermined position but also of the amount of such movement.

With these and other objects in view, as will be apparent to those skilled in the art, the invention resides in the combination of parts set forth in the specification and covered by the claims appanded hereto.

The character of the invention, however, may be best understood by reference to one of its structural forms, as illustrated by the accompanying drawings in which:

FIG. 1 is a schematic view of the index head of the invention including its control;

FIG. 2 is a schematic view of the control portion of the invention;

FIG. 3 is a schematic view of part of a pulse generator forming part of the invention;

FIG. 4 is a representation of a pulse amplifier forming part of the invention;

FIG. 5 is a circuit diagram of a pulse handling portion of the invention;

FIG. 6 is a graphical representation of certain pulse relationships encountered in the operation of the invention;

Figure 7:
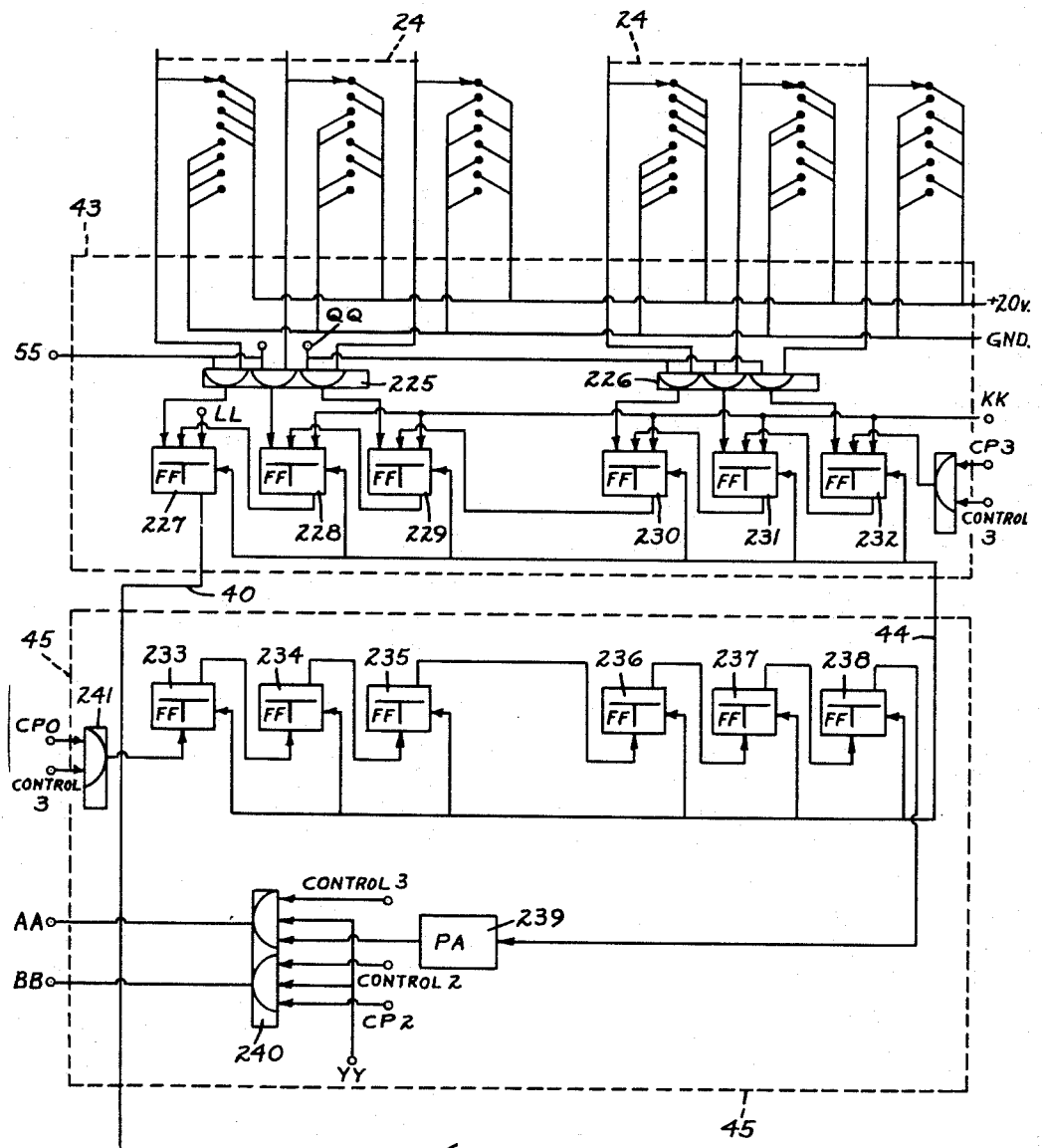
FIG. 7 is a schematic view of a remainder register.

Referring first of all to FIG. 1, wherein are shown the general features of the invention, the index head indicated generally by the reference numeral 10 is shown as comprising a movable portion 11 rotatably mounted in a base 12 and driven by a gear 13 mounted on the shaft 14 of a motor 15. The motor is of the type commonly known as a servo-motor and may be either electrical or hydraulic, depending upon the desired characteristics of the index head; for the purposes of the present invention, the servo-motor 15 is electrical. The movable portion 11 drives a gear 16 mounted on a shaft 17 leading to an encoder 18. This encoder is of the type known as a Digisyn, manufactured by the Wayne-George Corporation of Boston, Massachusetts. The encoder 18 is connected by a multi-line cable 19 to a numerical control 21. The numerical control is connected by a multi-line cable 22 to a selector switch box 23 having eight dials 24. The numerical control is electrically connected to a converter 25 which has the function of converting digital signals to analog signals. The converter is connected by a line 26 to a pre-amplifier 27 which, in turn, is connected through a line 28 to an amplifier 29. The output of the amplifier is connected through a line 31 to the servo-motor 15 for the energization thereof. The shaft 14 of the servo-motor is not only connected to the movable portion 11, but is also connected to a tachometer 32 having a line 33 connected back to the input line 28 of the amplifier 29.

Referring now to FIG. 2, wherein are shown some of the components of the numerical control 21, the connection to the selector switch box 23 is shown as taking place through the cable 22, which is directly connected to a main register or counter 34 forming part of the control. The encoder 18 is connected by its cable 19 to the main counter and by a cable 35 to an ADD-OR-SUBTRACT circuit 36. The main counter is also connected by a line 37 to a brake 38. The main countuer is also connected through a line 39 to a forward-reverse relay 41. The cable 22 from the selector switch box 23 is connected by another cable 42 to a remainder counter 43, the output of which is connected through a line 44 to a remainder register 45. The ADD-OR-SUBTRACT circuit 36 is connected by a line 48 to the main counter 34, and by a line 53 to the main counter. The error register 51 and the remainder register 45 are connected by a cable 54 which, in turn, is connected by a cable 55 to the main counter. The main counter is connected by a cable 56 to the error register 51.

In FIG. 3 is shown an optical unit 57 forming part of the encoder 18. A source of light 58 acts through a lens system 59 to provide a light of a collineated character. This light shines through an upper movable grid 61 and a fixed grid 62 to shine on photocells 63, 64, 65, and 66. The grids 61 and 62 are provided with fine grid marks consisting of alternate opaque lines and unmarked areas, thus providing alternate periods of light and darkness to the photocells. The photocells are geometrically related to the grids in such a way that they generate pulses in a peculiar manner. The photocell 63 is located at zero degrees electrically, while the photocell 64 is 90 electrical degrees away from the pulse of the photocell 63, the photocell 65 provides a pulse located 180 electrical degrees away from the pulse provided by the photocell 63, and the photocell 66 provides a pulse which is 270 electrical degrees away from the pulse provided by the photocell 63.

In FIG. 4 it can be seen that each of the photocell units 63, 64, 65 and 66 is connected by twisted signal and ground wires to the socket of a Cannon plug 67. The opposite member 68 of the plug is connected by various wires to amplifiers 71 and 72, these amplifiers serving other functions than merely increasing the strength of the pulses. The amplifiers 71 and 72 have output wires which are connected to one member 69 of a Cannon plug. The member 68 of the Cannon plug consists of elements 73, 74, 75, 76, 77, 78, 79 and 81, while the member 69 of its plug consists of elements 83, 84, 85, 86, 87, 88, 89, 91, 92, and 93. The elements 73, 74, 75, and 76 are connected through the member 67, respectively, to the signal and ground portions of the photocell 63 and the signal and ground portions of the photocell 65; in turn, those members are connected by lines 94, 95, 96, and 97 to the amplifier 68. The lines 96 and 97 are twisted together and the lines 94 and 95 are also twisted together. The lines 97 and 95, which are connected to the ground sides of their photocells, are connected to a ground line 98 runing through the amplifier 68. The element 93 of the plug member 69 is connected to ground while the elements 91 and 92 are connected to 115 volt A.C. source and through lines 99 and 101 to the primary of a transformer 102, the secondary of which is connected to the filament of the light 58. The secondary of the transformer is connected not only to the element 87 of the plug member 69 which is grounded, but also to the ground line 98 of the amplifier 68. Included in the amplifier are transistors 103 and 104 of the 2N1455 type making up a gain balance adjustment. Further on in the amplifier are located transistors 105 and 106 of the 2N1526 type making up an amplifying section. These are followed by two transistors 107 and 108 of the 2N1455 type; these are followed by rectifier transistors 109 and 111. These are followed by two transistors 112 and 113 of the 2N1455 type constituting a shaping section. These are followed in the amplifier by transistors 114 and 115 making up an emitter-follower section, these tubes being of the 2N1455 type.

One end of a two megohm resistor 116 is connected to the ground line 98 while the other end is connected to the line 94 and to the base of the transistor 103. The collector of the transistor 103 is connected through a 10 megohm resistor 117 to a common line 118. The collector of the transistor 104 is connected through a 10 megohm resistor 119 to the common line 118. The emitters of the transistors 103 and 104 are conected by serially arranged 220 ohm resistor 121, potentiometer 122, and 220 ohm resistor 123. The adjustable element of the 100 ohm potentiometer 122 is connected through a 1.8 megohm resistor 124 to one end of a phase-adjusting 1.0 megohm potentiometer 125, the movable element of which is connected to the end of the resistor element away from the end to which the resistor 124 is connected. The last-named end of the potentiometer 125 is also connected to a common line 126. The base of the transistor 104 is connected to the line 96. It is also connected through a 2.0 megohm resistor 127 to the ground line 98. It is also connected to the ground line 98 through a 47.0 megohm resistor 128 and a 0.1 microfarad capacitor 129. The common point between the resistor 128 and the capacitor 129 is connected by a line 131 to the movable element of a potentiometer 132 which serves for symmetry adjustment between the two amplifiers. The collector of the transistor 103 is connected by a line 133 to the base of the transistor 105 while the collector of the transistor 104 is connected by a line 134 to the base of the transistor 106. The emitters of the transistors 105 and 106 are connected by two 220 ohm resistors 135 and 136, the common point of which is connected by a 4.7 megohm resistor 137 to the common line 118. The line 118 is connected through a 22 ohm resistor 138 to the element 88 of the plug 69. This element, in turn, is connected to a 24 volt source, so that the common line 118 is a plus 24 volts D.C. potential. The emitter of the transistor 105 is connected through a 6.2 megohm resistor 139 to the line 126. Line 126 is connected, incidentally, through a 22 ohm resistor 141 to the element 89 of the plug 69. This element is connected to a minus 6 volt source, so that the line 126 is at minus 6 volts D.C. potential. The collector of the transistor 105 is also connected by a line 142 to the base of the transistor 108. The collector of the transistor 106 is connected through a 6.2 megohm resistor 143 to the line 126 and also is connected by a line 144 to the base of the transistor 107. The collectors of the transistors 107 and 108 are connected directly to the common line 118. The emitter of the transistor 107 is connected through a 3.3 megohm resistor 145 to the common line 126 and is connected through a dial transistor 111 to the base of its transistor 113. The emitter of the transistor 108 is connected through a 3.3 megohm resistor 146 to the line 126 and is also connected through the diode transistor 109 to the base of the transistor 112. The base of the transistor 112 is connected through a 6.8 megohm resistor 147 to the base of the transistor 115 by a line 148. The base of the transistor 112 is also connected through a 11 megohm resistor 149 to the line 126. The collector of the transistor 112 is connected through a 6.8 megohm resistor 151 to the line 118 and also is connected to the base of the transistor 114 by a line 152. The center of the line 152 is connected through a 6.8 megohm resistor 153 to the base of the transistor 113. The emitters of the transistors 112 and 112 are connected together and through a line 154 to the ground line 98. The collector of the transistor 113 is connected through the line 148 coming from the base of the transistor 112 and the two are connected through a 6.8 megohm resistor 155 to the line 118. The base of the transistor 113 is, as has been stated, connected to one side of a resistor 153, and is also connected to the emitter of the transistor 107 through the diode 111. It is further connected through an 11 megohm resistor 156 to the line 126. The collector of the transistor 114 is connected directly to the line 118, while its emitter is connected through a 2.2 megohm resistor 157 to the ground line 98. The emitter is also connected through a 150 ohm resistor 158 and a line 159 to the element 83 of the plug member 69. The collector of the transistor 115 is connected directly to the 24 volt line 118. Its emitter is connected through a 2.2 megohm resistor 161 to the ground line 98 and also to a 150 ohm resistor 162 to the element 84 of the plug member 69.

The elements 77, 78, 79, and 81 are connected, respectively, by lines 163, 164, 165, and 166 to the input of the amplifier 67 in the same manner that the lines 94, 95, 96 and 97 are connected to the amplifier 68. Furthermore, a line in the amplifier 67 corresponds to the line 98 in the amplifier 68 and is connected thereto by a line 167. Furthermore, a line from the amplifier 67 corresponds to the —6 volt line 126 in amplifier 68 and is connected thereto by a line 168. Two output lines 169 and 171 are connected from the output of the amplifier 67, respectively, to the elements 85 and 86 of the plug member 69.

Furthermore, a line 172 from the amplifier 67 is connected in the same manner as the +24 volt line 118 to the element 88 of the plug member 69, the line 172 providing the +24 volt source necessary to the amplifier 67.

A net work for adjusting symmetry of the two amplifiers has been previously suggested. The potentiometer 132 has its ends connected to a similar potentiometer 173 whose movable members are connected through a line 174 to a corresponding part of the amplifier 67 in the manner similar to the manner in which the line 131 is connected into the amplifier 68. The ends of the two potentiometers are connected together and are connected to oppositely arranged diode transistors 175 and 176 of the SG22 type. The common point of the two diodes is connected by a line 177 to the ground line 98. The side of the transistor 175 which is connected to the two potentiometers is connected through a 470 megohm resistor 178 and through a 510 ohm resistor 179 to the minus 6 volt line 126. The common point of the resistors 179 and 178 is connected through three series arranged diode transistors 181, 182, and 183, all of which are of the IN702A type. The other end of the series is connected to the common point between the transistors 175 and 176. This common point is also connected through a diode tranisistor 184 of the SV126 type. The other side of this last-named transistor is connected through a 2.7 megohm resistor 185 to the side of the transistor 176 which is connected to the potentiometers 132 and 173. The same side of the transistor 184 is connected through a 4.3 megohm transitron 186 to the 24 volt lines 172 and 118.

A 22 microfarad 15 volt capacitor 187 is connected from the minus 6 volt line 126 to the ground line 98. A 110 microfarad 30 volt capacitor 188 is connected from the ground line 98 to the 24 volt line 118 and 172.

Referring now to FIG. 5, the element 83 of the plug 69 is connected to an amplifying and time delay unit 189, while the element 84 is connected to a similar unit 191, the element 85 is connected to a similar unit 192, and the element 86 is connected to a similar unit 193. The output side of the unit 189 is connected by a line 194 to a gate unit 195 of a well-known type having a characteristic of passing only positive-going pulses. Similarly, the unit 191 is connected by a line 196 to the gate, the unit 192 is connected by a line 197 to the gate, and the unit 193 is connected by a line 198 to the gate. The output of the gate is connected by a line 199 to a pulse amplifier 201 whose output is connected to a further pulse amplifier 202 which is connected through the cable 19 to the main counter. The input side of the unit 189 is connected by a line 202 to the circuit 36. Similarly, the unit 191 is connected by a line 203 to the circuit 36, the unit 192 is connected to the circuit 36 by a line 204, and the unit 193 is connected by a line 205 to the unit 36. In a similar manner, the line 194 is connected by a line 206 to the unit 36 while a line 207 connects the line 196 to the circuit, a line 208 connects the line 197 to the circuit, and a line 209 connects the line 198 to the circuit. Included in the circuit 36 are eight AND logical units 211, 212, 213, 214, 215, 216, 217, and 218. The output lines of the AND units 211, 212, 213, and 214 are connected together and connected by a line 219 to an ADD-OR-SUBTRACT circuit 221. The AND units 215, 216, 217, and 218 output lines are connected through a line 222 to the ADD-OR-SUBTRACT circuit 221. Each of the AND units is provided with two input points and each logical unit is constructed in the usual manner so that the presence of two positive pulses at the same time on the input side of the AND unit will pass a pulse through its output line and through one of the lines 219 or 222 to the ADD-OR-SUBTRACT circuit 221. The ADD-OR-SUBTRACT circuit has the ability to send a pulse through the lines connecting it to the main counter 34. If a pulse arrives at the circuit 221 through the line 219 first, then a pulse passes through the line 223 to the main counter 34 and instructs the counter in such a manner that all pulses arriving after that time through the cable 19 are to be added to the count in the main counter. If, on the other hand, the pulse arrives at the circuit 221 through the line 222 first, then a pulse passes through a line 224 to the main counter 34 and instructs the main counter so that all pulses arriving after that time through the line 19 are to be subtracted from the count. The two input points of the AND unit 211 are connected to the lines 206 and 204. Similarly, the two input points of the unit 212 are connected to the lines 207 and 205, the two input points of the unit 213 are connected to the lines 208 and 203, and the input points of the unit 214 are connected to the lines 209 and 202. In a similar manner, the two input points of the unit 215 are connected to the lines 206 and 205, the input points of the unit 216 are connected to the lines 207 and 204, the input points of the unit 217 are connected to the lines 208 and 202, and the input points of the unit 218 are connected to the lines 209 and 203. The AND units which are connected by the line 219 to the circuit 221 are the "ADD" section, while the logical units which are connected by the line 222 to the circuit 221 are the "SUBTRACT" section.

The operation of the previously-described portions of the invention will now be readily understood in view of the above description. In the preferred embodiment, the apparatus controls the indexing of a circular workpiece in a rotating fixture in equally spaced steps of from 1 to 99 holes, the accuracy of indexing being 10 seconds of arc. The basic philosophy of the operation involves the use of a pulse generator which will produce 524,288 pulses in one revolution of the head and workpiece. This number is divided by the number of holes to be drilled; the quotient and the remainder are then converted to octal numbers and recorded on a chart. The rotary switches 24 are set according to the chart to produce the correct number of holes in the workpiece. When the cycle of indexing is started, the information set in the switches in the switch box 23 is read into the numerical control 24 and operates through the digital-to-analog converter 25, the preamplifier 27, and the power amplifier 29 to the torque or servo-motor 15 which rotates the fixture 11. The torque output of the motor is dependent on the impressed voltage and its phase relationship to the reference winding voltage. The servo-motor rotates the fixture through a 900-to-1 gear reduction. As the fixture 11 rotates, it turns the encoder 18 through an 8-to-1 gear ratio and the encoder sends pulses to the numerical control 21. These pulses determine how far the fixture has actually turned. In a general way, referring to FIG. 2, the cycle starts by the releasing of the brake 38 on the servo-motor. Then, the error from the last count is shifted from the main counter 34 into the error register 51 and the main counter is reset. The quotient and the remainder are then shifted into the numerical main counter 34. The error is then shifted from the error register into the main counter 34 and the remainder is shifted from the remainder register 45 into the counter when the remainder register is full. Pulses are fed to the digital-to-analog converter 25 through the line 26. The encoder 18 send pulses which are added or subtracted from the count in the main counter 34 and the brake 38 is applied when the count reaches zero at the end of the cycle.

The eight rotary switches 24 provide the input signals to the digital system. Using the chart provided with the machine, it is only necessary to select the number of holes to be drilled and to set the switches in accordance with the settings on the chart. When the cycle has been started in the usual manner by the operator of the machine tool or the like with which the invention is associated, the information which has been set on the switches 24 is read into the numerical control 21; actually, the reading passes through the lines represented by the cable 24 into the main counter 34. The main counter 34 consists of an 18-stage forward-backward counter, a 6-stage error correction counter, input circuits for pulse generating and direction determining, the digital-to-analog converter, and miscellaneous control circuits as will be described hereinafter. The main counter 34 consists of a series of flip-flop circuits which count in a well known manner. In the beginning of an operation, the quotient will be set in the main counter and the remainder will be placed in the remainder register 45. Whenever the accumulated elements in the remainder register reach a certain predetermined value, it will reset and at the same time will cause a pulse to be added to the main counter through the line 55 in a manner well known in this art. Once the proper count has been placed in the main counter 34 and the brake 38 has been released, the digital-to-analog converter 25 operates the servo-motor 15 and rotates the fixture. When the count passes through zero a timer is started, and after predetermined delay the brake 38 is automatically set. A tachometer feed-back is used to control the amount of feed-back from the tachometer 32 mounted on the servo-motor and this is introduced to the input of the power amplifier 29. This is a negative feed-back voltage and is used to decrease the output of the amplifier (thus decreasing the input to the servo-motor). This negative feed-back is necessary to reduce the amount and the time of oscillation when the fixture is "zeroing out." The servo-motor 15 has a reference and a control winding; 115 volts A.C. is applied to the reference winding at all times. The control winding is supplied with the output of the power amplifier 29. Phase shifting is done by a .75 microfarad capacitor in the input circuit of the power amplifier. In the preferred embodiment the tachometer is also mounted integrally with the servo-motor 15 and there is a cooling fan which must be run at all times to keep the motor from overheating.

The encoder 18 is a digital, shaft-angle transducer that is capable of resolving a single rotation into $2^{16}$ equal parts. This means that the angular magnitude of one increment or quantum is 19.8 seconds of arc and the maximum error due to quantization is plus or minus 10 seconds. The output of the encoder is fed into the direction sensing logic circuitry and the digital counter in order to provide total angle information. In the preferred embodiment the maximum input shaft rotation rate is 100 r.p.m. which corresponds to a counting rate of approximately 110 kilocycles. In order to allow direction sensing, two sets of wave trains are used. FIG. 6 shows the wave forms of the outputs of the photocells 63, 64, 65 and 66 as well as the same outputs after a time delay. By using each of these outputs as a gate signal working with the time derivative of the other output, direction sensing is achieved. This is because the time derivatives reverse sense when the direction of rotation is reversed, but the gate signal polarities are independent of rotation direction. Using the total of eight AND gates, every transition of each output is used for either direction or rotation.

As is shown in FIG. 3, the optical unit consists of the focused light source 58 and 59 and the single track code disk consisting of $2^{15}$ segments and the photoelectric detection assembly. The two pairs of photocell outputs provide low level differential signals to the two balanced differential amplifiers 71 and 72. The photocells 63, 64, 65, and 66 are arranged geometrically to provide outputs that are displaced by one-half of a bit from each other, as indicated in FIG. 6. The differential amplifiers raised the level of these signals to that required to operate the D.C. flip-flop circuits in the main counter 34. Before the signal leaves the amplifiers 72 and 72 they are buffered by emitter-followers which provide the final output signal from the encoder. Differential detection and amplification is used in order to minimize the effects of common-mode outputs from the cells and D.C. drift in the amplifiers. There are three potentiometer adjustments in each amplifier. Long term drift may require occasional resetting of the potentiometers 132 and 173 which take care of symmetry adjustment and of the potentiometer 125 for phase adjustment. The symmetry adjustment simply acts as a differential input bias on the amplifier. The pulses from the photocells 63, 64, 65, and 66 pass through the amplifiers and arrive at the plug elements 83, 84, 85 and 86, respectively. From there they pass through their amplifiers 189, 191, 192 and 193. For clarity of understanding, the pulses as they appear before amplification in these amplifiers and after they have been amplified and their time delay has been introduced are labeled A, B, C, D, E, F, G, and H and these various pulses are led to the logic circuits which determine the direction of rotation of the rotating element 11 of the index head and determine for the main counter whether the pulses should be added or subtracted from the count. As the head is brought to a stop, it will hunt around the "zero" or "final" position in a manner representable by a damped sine wave. Since the servo-motor 15 operates in the neighborhood of "zero" position with a torque proportional to the count in the main counter, it will always drive the head toward the "zero" position and, because of the torque diminishing the closer the head comes to the zero position, the result will be a short, damped series of cycles. Furthermore, any count remaining in the counter 34 when the head is stopped is the "error" which is introduced into the error register 51 after the cycle has been completed, so that the machine takes this into consideration in making the next indexing setting.

The logic units 221 through 218 operate on the principle that when two pulses exist on their input side they will pass a pulse. Therefore, whichever section passes a pulse first, determines for the main counter whether the pulses arriving through the line 19 will be added or subtracted from the count. From examination of FIG. 6 it can be seen that when the indexing head is moving to the right (indicated by the arrow R), the grouped pulses indicated on the ADD section will pass a pulse before the groups on the right hand or SUBTRACT section. This is true because of the time delay on the outputs of the amplifiers 189, 191, 192 and 193. For instance, on the AND unit 211 the pulses E and C will fire the unit at the time that the forward edge of the E pulse is reached. This point will be reached slightly before the actuation of the unit 216 by the pulses G and A on the unit 217, since the forward edge of the pulse A lags the forward edge of the pulse E by a few microseconds; that is, the amount of the time delay set in the amplifiers. Reverse of all this is true when the indexing head is moving to the left, as indicated by the arrow. If one of the logic units of the ADD section passes a pulse first to the ADD-SUBTRACT circuit 221, the counter is set for that indication through the lines 223 and 224 and remain that way until the next passage of the head through zero.

The remainder 43 and the remainder register 45 shown in FIG. 7 receives binary signals from the switches 24 indicative of the remainder which results when $2^{16}$ is divided by the number of holes desired in the workpiece. The two binary signals are fed into the logic units 225 and 226 whose output serve to set the flip-flops 227 through 232. The remainder register 45 is made up of six flip-flops 233 through 238, as well as a pulse amplifier 239 and logic units 240 and 241. The flip-flops are similar to Model FF–103 manufactured by Computer Control Co., Inc., Framingham, Massachusetts. The pulse amplifier 239 is similar to the Model PA–104 manufactured by the same company; the logics unit are of the type having a plurality of two-leg AND gates such as Model DG 302 of the same company. In the case of the units 225 and 226 all three of the AND gates are used; in the unit 240 only two of the AND gates are used, while in the unit 241 only one AND gate is used.

Figure 8:
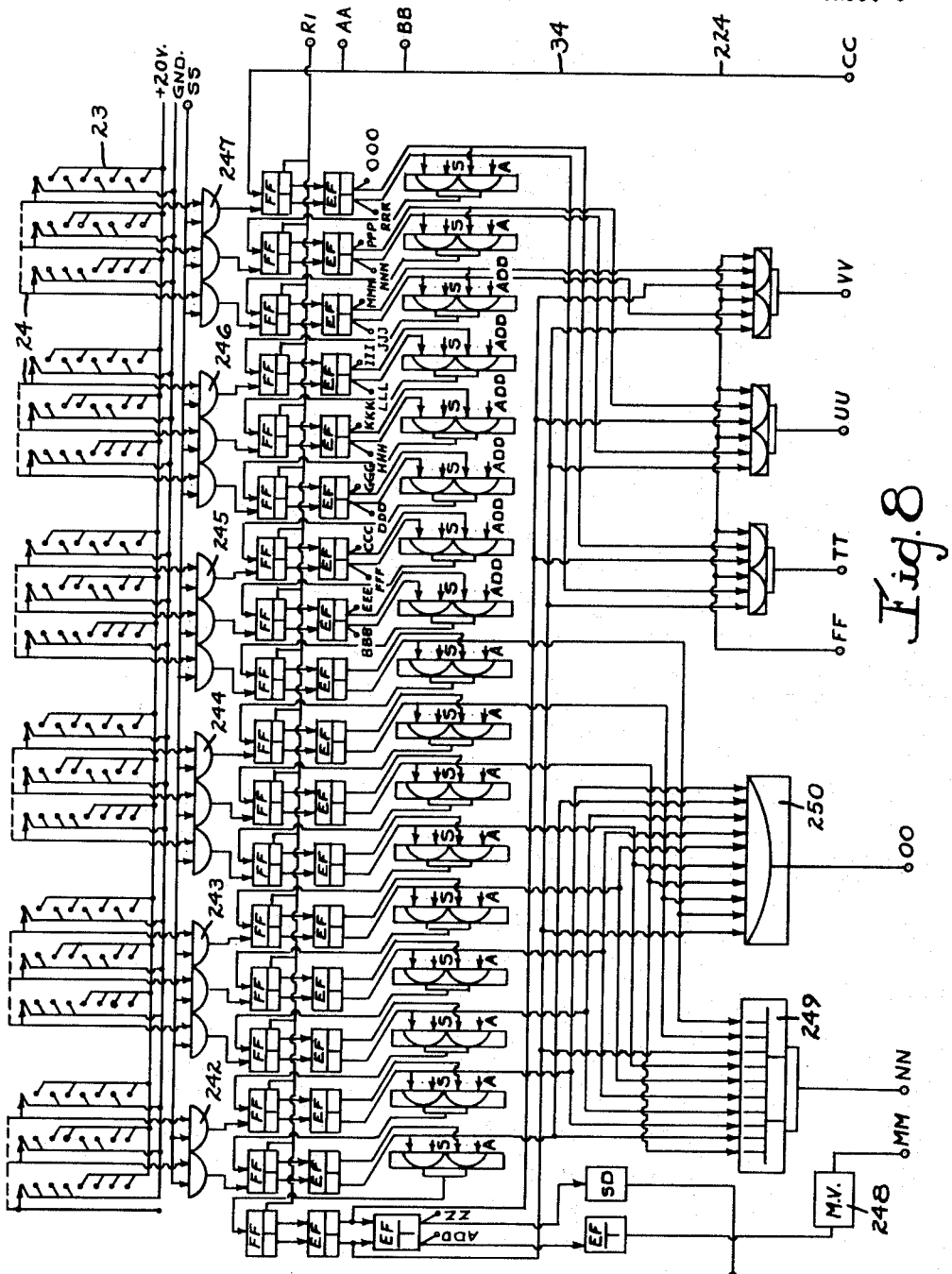
FIG. 8 is a schematic view of a main counter.

The main counter 34 is shown in FIG. 8. The quotient set up on the switches 24 passes a binary count into logic units 242 through 247, each of which contains three AND gates with the exception of unit 242 which uses only two AND gates. The output of each AND gate is fed into a flip-flop and each flip-flop is connected to an emitter follower, such as Model EF–101 manufactured by Computer Control Co., Inc. Each emitter follower is connected to a logic unit having two AND gates. The main counter 34 also contains a multivibrator 248 and two eight-leg AND gates 249 and 250.

Figure 9:
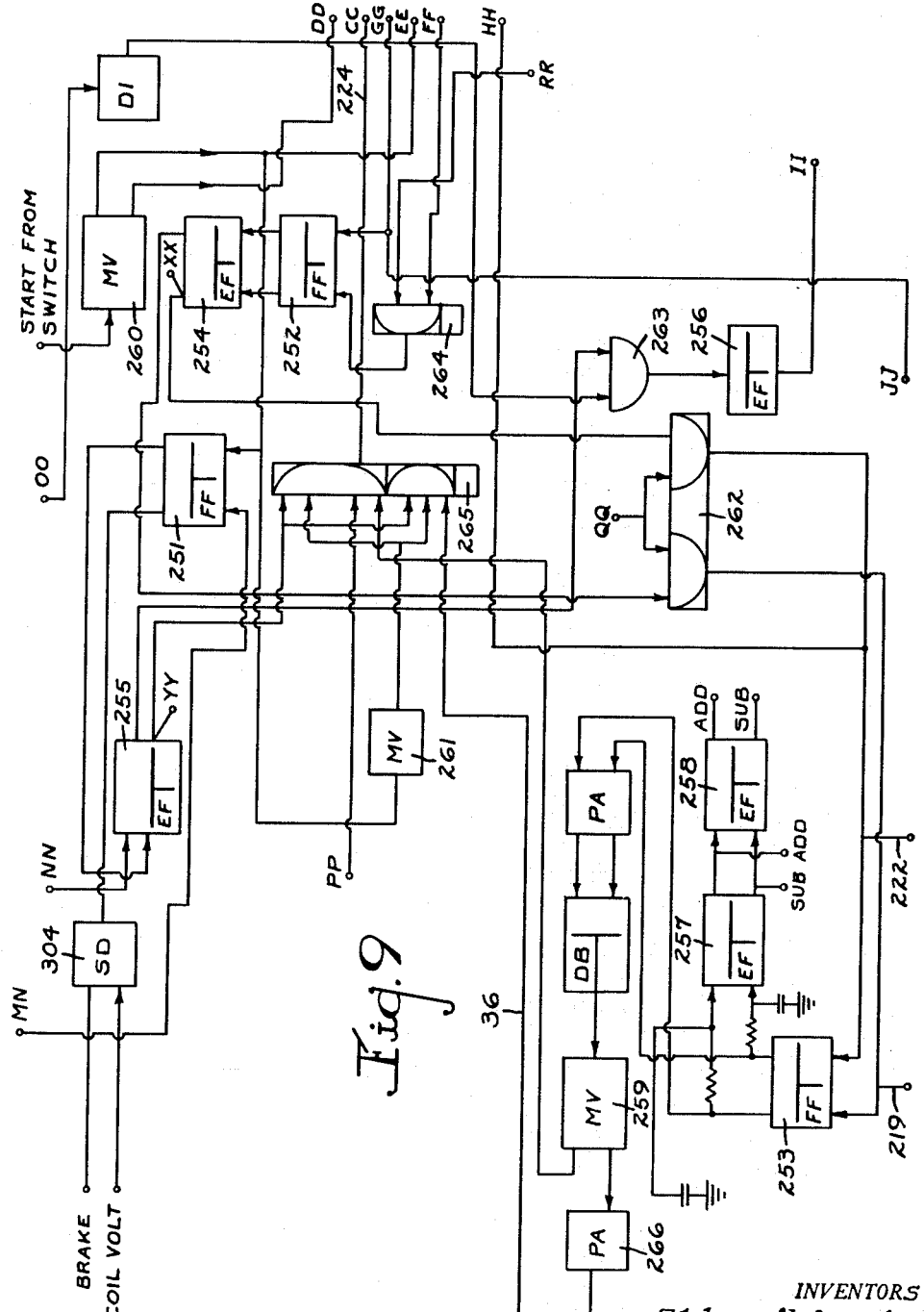
FIG. 9 is a schematic view of an add-or-subtract circuit.

The ADD-OR-SUBTRACT circuit 36 is shown in FIG. 9. The circuit contains flip-flop 251, 252, and 253, emitter followers 254, 255, 256, 257, and 258, multivibrators 259, 260, and 261, and a pulse amplifier 266. The circuit also contains a logic unit 262 having two two-leg AND gates, a two-leg AND gate 263, a two-leg AND gate 264, and a logic unit 265 having a seven-leg gate.

Figure 10:
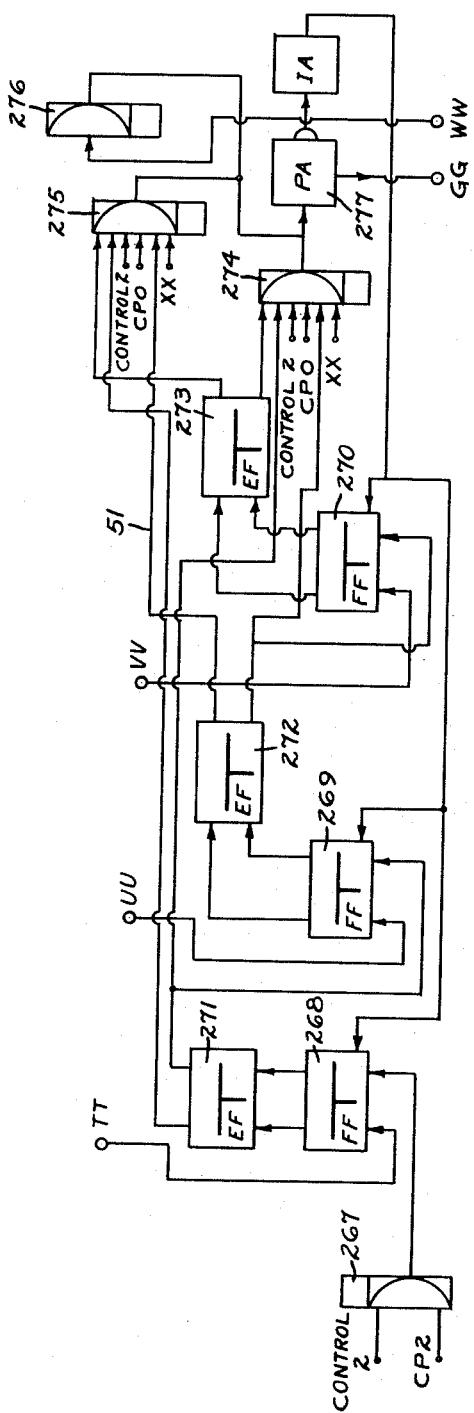
FIG. 10 is a schematic view of an error register.

The error register 51 is shown in FIG. 10. It contains a two-leg AND gate 267, flip-flops 268, 269, and 270, and emitter followers 271, 272, and 273. It also contains a six-leg AND gate 274, a six-leg AND gate 275, a diode 276, and a pulse amplifier 277.

Figure 11:
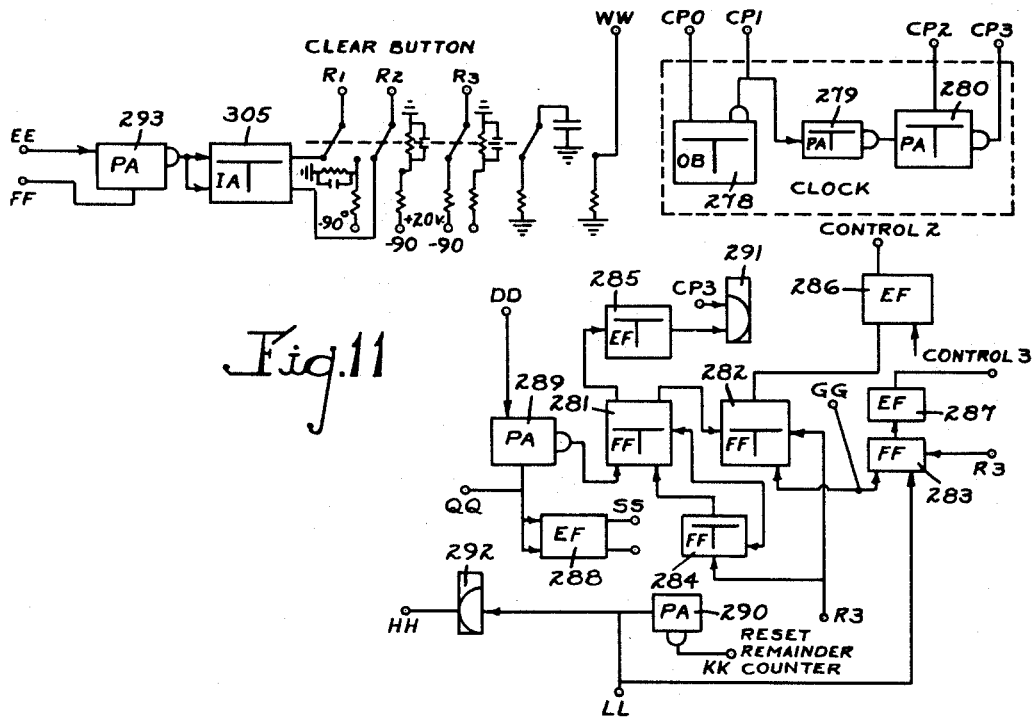
FIG. 11 is a schematic view of a clock and clock control.

FIG. 11 shows the details of the clock and the clock control. The clock itself consists of a free-running multivibrator 278 feeding into a pulse amplifier 279 and a pulse amplifier 280. The clock control contains flip-flops 281, 282, 283, and 284, emitter followers 285, 286, 287, and 288, as well as pulse amplifiers 289 and 290, a two-leg AND gate 91 and a diode 292. Also included is a pulse amplifier 293 and various resistors and capacitors arranged as shown.

Figure 12:
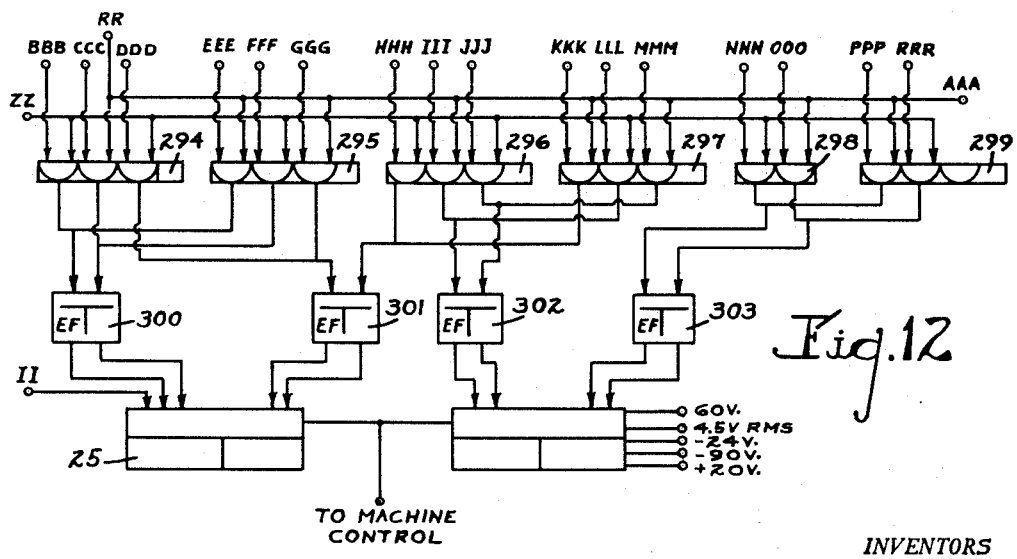
FIG. 12 is a schematic view of a digital-to-analog converter.

FIG. 12 shows the details of the digital-to-analog converter 25 which has a series of logic units 294 through 299; each of these logic units consists of three two-leg AND gates, with the exception of the units 298 and 299 each of which consists of two two-leg AND gates. The series of logic units are connected to emitter followers 300, 301, 302, and 303.

In a general way, the apparatus operates in the following series of steps:

(1) At the cycle start, the brake (fixture clamp) is released.
(2) The error is shifted into the error register.
(3) The main (forward-backward) counter is reset.
(4) The quotient is shifted into the main counter, and remainder is shifted into remainder counter.
(5) The error is shifted from the error register into the main counter.
(6) The remainder is shifted from the remainder register into the main counter.
(7) Pulses are fed into the digital-to-analog converter.
(8) The encoder signals pulses to the main counter where they are subtracted (and, later, added) from the count.
(9) The brake is applied.

In the beginning, all the flip-flops are reset except flip-flop 251 which is set when the clear button is depressed. The input to the solenoid driver 304 is now high and will energize the brake. When the start button is pressed, the multivibrator 260 is triggered; the line leading to RR has a positive going step at the time of triggering and serves two functions: (1) resets the flip-flop 251, thus deenergizing the brake, and (2) it triggers the pulse amplifier 293. The normal output of this pulse amplifier at the point FF is timed with the input step and is connected to the gates of the main counter (FIG. 8) whose outputs are connected to TT, UU and VV and to the gate 264 in the ADD-OR-SUBTRACT circuit (FIG. 9). The gates connected to the points TT, UU and VV control the count that is inserted into the error correction counter (flip-flops 268, 269 and 270).

The delayed output of the pulse amplifier 293, which occurs two microseconds after the normal output, drives into two IA circuits 305; this package resets all the main counter flip-flops. The delayed output of the multivibrator 260 (point DD) triggers the pulse amplifier 289 (FIG. 11) the normal output of which is connected to the emitter follower 288. The output of the pulse amplifier and the emitter follower (point SS) controls the top row of gates 242 through 247 of the main counter (FIG. 8) and the gates 225 and 226 of the remainder (FIG. 7). Depending on the setting of the remainder and quotient switches, the quotient will set into the main counter and the remainder into the remainder counter.

The delayed output of the pulse amplifier 289 (FIG. 11) sets the flip-flop 281 enabling the gate 291 through the emitter follower 285, so that the next clock pulse from the pulse amplifier 280 (CP3) will be gated through the gate 291 and set flip-flop 284. The next CP3 clock pulse will also go through the gate 291 and reset the flip-flop 284 causing flip-flop 281 to be reset. The reset output of flip-flop 281 sets the flip-flop 282 (Control 2). The set output of the flip-flop 281 now disables the gate 291 through the emitter follower 285.

At this point, the flip-flop 282 is now set and this will enable the gates 240 (to point BB), the gate 274, the gate 275, and the gate 267 through the emitter follower 286 (Control 2). The gate 274 will have an output pulse at CP0 time, provided the error correction register has a count of all zeros. If a pulse goes through (indicating a zero count), the pulse amplifier 277 is triggered, which will accomplish three things:

First, the flip-flop 282 is reset.
Secondly, a pulse will be inserted into the set input on flip-flop 253 to insure the "ADD" condition.
253 to insure the "ADD" condition.
Thirdly, set the flip-flop 283.

If no pulse was able to pass through gate 274, then, at the next CP2 time, a pulse will pass through both gates 267 and gate 240 to point BB. The pulse through the gate 267 counts down in the error correction register and the pulse through the gate 240 puts a count into the main counter.

When the error correction register allows the pulse amplifier 277 to be triggered, the flip-flop 283 (to Control 3) is set. The emitter follower 287 places this set condition into the gates 240 (to point AA), 241, and 276. Control 3 goes high at approximately CP1 time so that at CP3 time a pulse is gated into the remainder counter causing a downward count. At CP0 time, a pulse will be passed through gate 241 into the remainder accumulator and counts up. The remainder counter will continue to count down until an end carry triggers the pulse amplifier 290. The normal output of this pulse amplifier resets the Control 3 flip-flop 283, resets the flip-flop 253 to the "subtract" condition, and also resets the flip-flop 227 (FIG. 7) through point LL. The delayed output resets the rest of the remainder counter. During the time that the remainder counter is being controlled, pulses are being accumulated in the remainder accumulation. An end carry pulse will be generated whenever the accumulator is filled. The pulse amplifier 239 is triggered and a pulse is generated and will cause a count of the main counter through the gate 240 to point AA.

Within 7 milliseconds after the start pulse triggers the multivibrator 260 all the counting has been completed. The relay controlling the brake is de-energized at the same time that the multivibrator is triggered. The response time of the relay will be greater than 10 milliseconds so that the servo system will not start to operate until after all the counting is complete. At the time that the servo starts to respond a number is stored in the main counter. This results in the output of the digital-to-analog converter saturating the servo amplifier and driving the head and workpiece; the pulses from the encoder operate to decrease the count in the main counter. At a count of 255, the digital-to-analog converter starts to drive the servo amplifier with a linear voltage as the system approaches the zero count. When the count passes zero, a positive pulse from the emitter follower connected to the multivibrator 248 triggers it to cause a delay time and then set the flip-flop 251, thereby energizing the brake through solenoid driver 304. This delay time is determined by the servo response of the system.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An index head, comprising a movable fixture, a main counter adapted to be set at a count representative of a movement through which the fixture is to be moved in a first direction, means for driving the fixture with a force at any time proportional to the count in the counter after the count has been reduced below a predetermined value, a transducer associated with the fixture and connected to the main counter to transmit to it pulses which add to or subtract from the count depending upon the direction of movement of the fixture, the transducer producing a first set of pulses and a second set of pulses each pulse of which lags a corresponding pulse of the first set by 90 electrical degrees when the fixture moves in the first direction, the pulses of the first set lagging the pulses of the second set by 90 electrical degrees when the fixture moves in a second direction, means causing the pulses to subtract from the count when the pulses in the first set lead the pulses of the second set and causing the pulses to add to the count when the pulses in the second set lead the pulses in the first set, the last-named means consisting of a time delay for the first series of pulses and a time delay for the second series, a first AND logic unit when operative causing the main counter to subtract arriving pulses from the count, a second AND logic unit when operative causing the main counter to add arriving pulses to the count, each logic unit being rendered operative by the presence of two pulses at the same time on its input side, and means associated with the counter for maintaining the add or subtract condition of the counter until a reversal of direction of the fixture takes place.

2. An index head, comprising a main counter adapted to be set at a count representative of a movement through which the head is to be moved in a first direction, means for driving the head with a force proportional to the count in the counter, a transducer driven by the head consisting of a transparent optical unit formed with opaque stripes, a light source at one side of the unit, and photocells on the other side of the unit, the photocells being connected to the main counter to transmit to it pulses which add to or subtract from the count depending upon the direction of movement of the head, one photocell producing a first set of pulses and another photocell producing a second set of pulses, the photocells being geometrically related so that each pulse of the second set lags a corresponding pulse of the first set by 90 electrical degrees when the head moves in the first direction, the pulses of the first set lagging the pulses of the second set by 90 electrical degrees when the head moves in a second direction, means causing the pulses to subtract from the count when the pulses in the first set lead the pulses of the second set and causing the pulses to add to the count when the pulses in the second set lead the pulses in the first set, the last-named means consisting of a time delay for the first series of pulses and a time delay for the second series, a first AND logic unit when operative causing the main counter to subtract arriving pulses from the count, a second AND logic unit when operative causing the main counter to add arriving pulses to the count, each logic unit being rendered operative by the presence of two pulses at the same time on its input side.

3. An index head, comprising a main counter adapted to be set at a count representative of a movement to which the head is to be moved in a first direction, means for driving the head with a force proportional to the count in the counter, a transducer associated with the head and connected to the main counter to transmit to it pulses which add to or subtract from the count depending upon the direction of movement of the head, the transducer producing a first set of pulses at zero degrees and 180 degrees and a second set of pulses at 90 degrees and 270 degrees when the head moves in the first direction, the pulses of the first set lagging the pulses of the second set by 90 electrical degrees when the head moves in a second direction, means causing the pulses to subtract from the count when the pulses in the first set lead the pulses of the second set and causing the pulses to add to the count when the pulses in the second set lead the pulses in the first set, the last-named means consisting of a time delay for the first series of pulses and a time delay for the second series so that four pulses are provided without time delay and four pulses with time delay, a first series of four AND logic units when operative causing the main counter to subtract arriving pulses from the count, a second series of four AND logic units when operative causing the main counter to add arriving pulses to the count, each logic unit being rendered operative by the presence of two pulses at the same time on its input side, each logic unit being connected to receive one pulse without time delay and one pulse with time delay.

4. An index head, comprising a movable fixture, a main counter adapted to be set at a count representative of a movement through which the fixture is to be moved in a first direction, means for driving the fixture with a force proportional to the count in the counter when the count is below a predetermined value, a transducer driven by the fixture consisting of a transparent optical unit formed with opaque stripes, a light source at one side of the unit, photocells on the other side of the unit, the photocells being connected to the main counter to transmit to it pulses which add or subtract from the count depending on the direction of movement of the fixture, two photocells producing a first set of pulses at zero degrees and 180 degrees and a second set of photocells producing a set of pulses at 90 degrees and at 270 degrees when the head moves in the first direction, the photocells being geometrically related so that the pulses of the first set lag the pulses of the second set by 90 electrical degrees when the fixture moves in a second direction, means causing the pulses to subtract from the count when the pulses in the first set lead the pulses of the second set and causing the pulses to add to the count when the pulses of the second set lead the pulses in the first set, the last-named means consisting of a time delay for the first series of pulses and a time delay for the second series, so that there are four pulses without time delay and four pulses with time delay, a first series of four AND logic units when operative causing the main counter to subtract arriving pulses from the count, a series of four AND logic units when operative causing the main counter to add arriving pulses to the count, each logic unit being rendered operative by the presence of two pulses at the same time on its input side, each logic unit being connected to receive one pulse without time delay and one pulse with time delay, and means associated with the counter for maintaining the ADD or SUBTRACT condition of the counter until a reversal of direction of the fixture takes place.

5. An index head, comprising a main digital counter adapted to be set at a count representative of the magnitude of a movement of the head from an initial position to a final position, a motor connected to the head for producing the said movement, means connecting the counter to the motor and controlling the energization of the motor to a value proportional to the count remaining in the main counter, pulse means associated with the head and connected to the main counter, the pulse means producing a first set of pulses indicative of the movement of the head and a second set of pulses each pulse of which lag a corresponding pulse of the first set by 90 electrical degrees when the head moves in a first position, the pulses of the first set lagging the pulses of the second set by 90 electrical degrees when the head moves in a second direction, direction sensing means causing the pulses to subtract from the count in the main counter when the pulses in the first set lead the pulses of the second set and causing the pulses to add to the count when the pulses in the second set lead the pulses in the first set, the direction sensing means consisting of a time delay for the first series of pulses and a time delay for the second series, a first AND logic unit when operative causing the main counter to subtract arriving pulses from the count, a second AND logic unit when operative causing the main counter to add arriving pulses to the count, each logic unit being rendered operative by the presence of two pulses at the same time on its input side.

References Cited in the file of this patent

UNITED STATES PATENTS

| | | |
|---|---|---|
| 2,537,427 | Seid et al. | Jan. 9, 1951 |
| 2,656,106 | Stabler | Oct. 20, 1953 |
| 2,907,937 | Apgar | Oct. 6, 1959 |